United States Patent Office 3,523,113
Patented Aug. 4, 1970

3,523,113
PRODUCTS OF POLYMERIZATION UTILIZING ALKYLIDENEHYDROXYHYDROPEROXIDE
Oliver W. Burke, Jr., 506 Intracoastal Drive, Fort Lauderdale, Fla. 33304, and Eldon E. Stahly, Ellicott City, Md.; said Stahly assignor to said Burke
No Drawing. Continuation of application Ser. No. 640,406, May 22, 1967. This application July 10, 1969, Ser. No. 845,657
Int. Cl. C08d 3/04, 3/06, 3/16
U.S. Cl. 260—94.2
6 Claims

ABSTRACT OF THE DISCLOSURE

A new class of polymers of ethylenically unsaturated monomer material is provided which polymers comprise, in addition to the polymerized monomer material therein, substituent functional groups derived from alkylidenehydroxyhydroperoxide, part of which group are hydroxyalkylidenoxy groups, and part of which groups are hydroxy groups. The disclosure also sets forth processes for producing such new polymers.

CROSS-REFERENCE TO RELATED APPLICATION

This application is a continuation of application Ser. No. 640,406, filed May 22, 1967, now abandoned, itself a division and/or continuation-in-part of parent application Ser. No. 324,835 filed Nov. 19, 1963 (now Pat. No. 3,333,018 issued July 25, 1967), which claims the process referred to in the above abstract by which the new products, claimed herein, are obtainable.

BACKGROUND OF THE INVENTION

Field of the invention

The invention relates to synthetic polymer of unsaturated carbon compounds (class 260 subclass 80).

Description of the prior art

Synthetic polymers of unsaturated carbon compounds containing hydroxy functional substituents or alkoxy functional substituents are known, and have been formed by polymerization of unsaturated carbon compounds with hydrogen peroxide or with dialkyl-peroxide, or alkyl-hydroperoxide compounds.

SUMMARY OF THE INVENTION

The present invention provides synthetic polymers of unsaturated carbon compounds which comprise, in addition to the polymerized unsaturated monomer material therein, substituent functional groups derived from alkylidenehydroxyhydroperoxide, i.e., such groups which are in part hydroxy groups and which are in part hydroxyalklidenoxy groups.

DESCRIPTION OF THE PREFERRED EMBODIMENTS

As is set forth in the aforementioned parent application the overall invention disclosed therein and herein comprises a new process (claimed in said parent application) and new products producible thereby (claimed herein), and relates to the production of polymers, and particularly, but not exclusively, to the production of unsaturated liquid polymers of polymerizable conjugated diene monomers containing from 4 to 8 carbon atoms. The polymers may be homopolymers or copolymers of ethylenically unsaturated monomer materials, and in the case of dienic polymers may be liquid homopolymers or copolymers of such dienes or liquid copolymers of a substantial production of one or more such dienes with one or more other copolymerizable ethylenically unsaturated monomer materials. Such liquid polymers are useful in the formation of protective coatings, inks, adhesives, etc.

An object of the overall invention is to provide a new process for the polymerization of ethylenically unsaturated monomer material characterized in that the polymerization of the monomer material is effected with the aid of alkylidenehydroxyhydroperoxide having from 2 to 6 carbon atoms, and especially with the aid of the sec-$C_3$ to $C_4$ alkylidenehydroxyhydroperoxides, as catalyst, preferably in homogenous mixture with lower molecular weight alcohol, e.g., alcohol containing from 1 to 6 carbon atoms, preferably 1 to 4 carbon atoms, with or without the presence of diluent material such as $C_2$ to $C_6$ carbonyls, other peroxy compounds and minor proportions of other ingredients.

More particularly, the said process comprises:

(a) Forming a homogenous reaction solution comprising, by weight, (1) 100 parts polymerizable ethylenically unsaturated monomer material (preferably with 10 to 200 parts alcohol and most preferably with 30–50 parts thereof) and (2) 0.5 to 10 parts alkylidenehydroxyhydroperoxide (preferably 1–5 parts and most preferably 2–4 parts), (b) Heating said mixture (1) at a temperature in the range of above 100 to 200° C. (preferably, 105 to 150° C. and most preferably, 115 to 130° C.), (2) for from 10 minutes to 10 hours, (3) to a conversion of the monomer material to polymer of at least 35% (preferably, about 50 to 75%) and, (c) Recovering the formed polymer material, (d) Said ethylenically unsaturated monomer material preferably comprising by weight at least 10% (most preferably from over 50% to 100%) conjugated diene monomer material containing from 4 to 8 carbon atoms, and (e) Said alkylidenehydroxyhydroperoxide containing from 2 to 6 carbon atoms (and preferably being a sec-alkylidenehydroxyhydroperoxide containing 3 to 4 carbon atoms).

The conjugated diene monomers which may be employed contain and are polymerizable through a plurality of >C=C< group and contain from 4 to 8 carbon atoms. These monomers preferably are selected from the group consisting of butadiene-1,3
isoprene
2-methoxy-butadiene-1,3
piperylene (pentadiene-1,3)
2,3-dimethyl-butadiene-1,3
1,1-dimethyl-butadiene-1,3
1,4-dimethyl-butadiene-1,3
the trimethyl and tetramethyl butadiene-1,3's
chloroprene
cyclopentadiene, and the like.

Among the ethylenically unsaturated monomer materials which may be polymerized per se or may be copolymerized with said diene monomers are the compounds containing and polymerizable through an individual >C=C< group with the aid of a free radical generating polymerization catalyst, which are (basics: Pat. No. 3,085,074, cited in specification as filed. Form approved in Hedrick et al. Pat. No. 2,625,529—666 O.G. 560, and Burke et al. Pat. No. 3,085,074—789 O.G. 513), set forth in Burke et al. U.S. Pat. No. 3,085,074 dated Apr. 9, 1963, at col. 5, line 60 to col. 7, line 21. Preferably, these monomers are selected from the class consisting of the polymerizable vinyl, vinylidene and allyl compounds. Particularly suitable are the polymerizable vinylbenzenes, vinylcyanides, vinylamides, vinylpyridines, vinylpyrrolidone, halogen substituted ethylenes and propylenes, alkyl-vinyl-ethers, alkyl-vinyl-ketones; acrylic acids and their esters; vinyl acetate; allyl alcohol and its esters; and combinations of any two or more members of the foregoing. As herein used, the aforesaid terms designate the groups consisting of the members here named—

*Vinylbenzenes.*—Styrene, alpha-methylstyrene and the ring substituted styrenes and alpha-methylstyrenes having one to two $C_1$ to $C_6$ alkyl substituents, and the like.

*Vinyl cyanides.*—Acrylonitrile and methacrylonitriles and the like.

*Vinyl amides.*—Acrylamide, methacrylamide, and the mono- and di-($C_1$ to $C_6$ alkyl)-N-substituted acrylamides and methacrylamides, and the like.

*Vinyl pyridines.*—Vinyl pyridines and the ring substituted vinyl pyridines having one to two $C_1$ to $C_6$ alkyl substituents, and the like.

*Halogen substituted ethylenes and propylenes.*—Vinyl chloride, vinyl fluoride, vinylidene chloride, vinylidene fluoride, trichloroethylene, trifluorochloroethylene, and trifluoropropylene, and the like.

*Alkyl-vinyl-ethers.*—The ($C_1$ to $C_6$ alkyl)-vinyl-ethers, trifluoropropylene, and the like.

*Alkyl-vinyl-ketones.* — Methylvinylketone, methylisopropenylketone, and the like,

*Acrylic acids and their esters.*—Acrylic acid, the alpha-($C_1$ to $C_6$ alkyl)-substituted acrylic acids, the beta-($C_1$ to $C_6$ alkyl)-substituted acrylic acids, and the $C_1$ to $C_{12}$ alkyl esters of these acrylic acids; and the like.

*Allyl alcohol and its esters.*—Allyl alcohol, and the mono- and di-allyl esters of $C_2$ to $C_{12}$ mono- and dicarboxylic acids, and the like.

Also among the ethylenically unsaturated monomer materials are the drying oil substances which may be interpolymerized with ethylenically unsaturated monomer materials with the aid of the alkylidenehydroxyhydroperoxides and alcohols hereof. The term drying oil substances as herein used is limited to (1) the drying oils including linseed, perilla and fish oils and especially those drying oils containing conjugated unsaturation, e.g., tung oil, oiticica oil, conjugated linseed oil, conjugated soya bean oils, dehydrated castor oil, isano oil, etc., (2) the bodied drying oils, whether from conjugated or nonconjugated oils and whether bodied by heat and/or catalytically, and (3) the fatty acids and/or dimers, trimers and tetramers thereof, derived from such conjugated or bodied drying oils. While the drying oil substances are not to be regarded as monomers for the purpose of forming homopolymers, they are ethylenically unsaturated monomers to the extent that they can be interpolymerized with monomers set forth above, and the term "ethylenically unsaturated monomer material" which is generic to the conjugated dienes and other hereinbefore named monomers, is to be understood accordingly.

Among the alkylidenehydroxyhydroperoxides containing from 2 to 6 carbon atoms employed as polymerization catalysts according to this invention are those in which the alkylidene group is ethylidene, 1-propylidene, 2-propylidene, 1-butylidene, 2-butylidene, 2-methyl-1-propylidene, 1-pentylidene, 2-pentylidene, 3-pentylidene, 2-methyl-1-butylidene, 3-methyl-2-butylidene, 3-methyl-1-butylidene, 2,2-dimethyl-1-propylidene, 1-hexylidene, 2-hexylidene, 3-hexylidene, 2-methyl-1-pentylidene, 3-methyl-1-pentylidene, 3-methyl-2-pentylidene, 4-methyl-1-pentylidene, 4-methyl 2 - pentylidene, 2,2-dimethyl-1-butylidene, 2,3-dimethyl-1-butylidene, 3,3-dimethyl-2-butylidene, 3,3-dimethyl-1-butylidene. Of these, the secondary alkylidenehydroxyhydroperoxides containing from three to four carbon atoms are preferred, namely: 2-propylidenehydroxyhydroperoxide and 2-butylidenehydroxyhydroperoxide. Mixtures of any two or more of the foregoing alkylidenehydroxyhydroperoxides may be employed, as may mixtures of any of the foregoing alkylidenehydroxyhydroperoxides with catalysts of the organic peroxide, organic hydroperoxide, and hydrogen peroxide types heretofore employed as polymerization initiators. The alkylidenehydroxyhydroperoxides are preferably employed in combination with alcohols containing 1 to 6 carbon atoms with or without the presence of ketones containing 3 to 6 carbon atoms, or aldehydes containing 2 to 6 carbon atoms, or both, as is hereinafter exemplified. The alkylidenehydroxyhydroperoxides are preferably employed with alcohols and/or carbonyls of corresponding structure with or without some hydrogen peroxide and/or water. The polymerizations with the alkylidenehydroxyhydroperoxides with or without hydrogen peroxide may be promoted by traces of transition metal salts, especially cobalt salts, with or without complexing agents such as phosphates, pyrophosphates and the like. The alkylidenehydroxyhydroperoxides may be employed in the present invention in relatively pure state, or as crude materials of sufficient concentrations.

The lower molecular weight alcohols usable in accordance with the present invention are those having 1 to 6 carbon atoms, preferably the monohydroxy alcohols having 1 to 4 carbon atoms, and include, but are not restricted to the following:

| methanol | 1-butanol |
| ethanol | 2-butanol |
| 1-propanol | iso-butanol |
| 2-propanol | tert-butanol |

These alcohols may be used individually or in combination of two or more thereof, or in mixtures with minor proportions of diluents, especially in mixtures with water and/or $C_5$ to $C_{10}$ hydrocarbon and/or carbonyl components in which the alcohol predominates, but anhydrous conditions are frequently desirable.

In accordance with the present invention the reaction materials are combined in a homogenous phase in substantially the following proportions:

| Component | Proportion: Parts by weight | | |
| --- | --- | --- | --- |
| | Range | Preferred range | Most preferred range |
| Dienic monomer | 100 | 100 | 100 |
| Alcohol (when used) with or without minor proportion of diluent | 10–200 | 25–100 | 30–50 |
| Alkylidenehydroxyhydroperoxide catalyst | 0.5–10 | 1–5 | 2–4 |

The term homogenous phase connotes that all the aforesaid components are in solution in each other. To effect the polymerization, the reaction mixture is heated in the temperature range of above 100° C. to 200° C., preferably 105 to 150° C., most preferably 115 to 130° C. from 10 minutes to 10 hours to a conversion of monomer to polymer of at least about 35% and preferably about 50 to 75% followed by recovery of the formed polymer.

The polymerizations at above 100° C. are carried out batchwise or continuously in suitable pressure equipment, and the present process of polymerization may be carried out conjointly with the process of copending U.S. application Ser. No. 863,218 (Case 30) employing hydrogen peroxide in the presence or absence of alcohol. The recovery of the polymer may be effected in any suitable manner, i.e., the volatile materials such as monomer, alcohol, etc., may be vaporized, and when desired the residual catalyst can be destroyed with a polymerization short stop agent. If desired, anti oxidant and other modifying materials may be added before or after the removal of the volatile materials. The alcohol, when used, is readily separated from the polymer, e.g., by heating and vaporizing, and may be recycled.

Preparation of graft copolymers and terpolymers may be effected by the present process in a two-step or multi-step polymerization. A first monomer material or mixture, e.g., one comprising a diene, can be initially charged with the alkylidenehydroxyhydroperoxide catalyst and partially polymerized, and then one or more additional monomers such as styrene, acrylonitrile, acrylic acid, methacrylic acid, acrylamide, and the like or mixtures of 2 or more monomers can be charged and the polymerization is then continued to the desired conversion.

The dienic monomer material when herein employed for producing liquid polymer comprises at least 10% of conjugated diene monomer material with not more than 90% monoethylenically unsaturated co-monomer material, and preferably contains from 30 to 100% conjugated diene monomer material, most preferably from at least 50% to 100% conjugated diene monomer material. By varying the concentrations of these components and the percentages of conversion and the temperature and time of the reaction within the aforesaid ranges, liquid polymers may be obtained having viscosities at 30° C. in the range of from 30 to 30,000 poises, preferably 500 to 5000 poises, and the term liquid polymers is herein used in this sense.

A further understanding of the invention may be obtained from the following specific examples, which, however, are to be taken as illustrative and not restrictive of process and product of the invention, the scope of which is pointed out in the appended claims, respectively, of said parent application and of this application.

EXAMPLE 1

In a 5-gallon aluminum lined reactor is placed a solution of the following composition:

|  | Grams |
|---|---|
| 2 - propylidienehydroxyhydroperoxide | 165 |
| Hydrogen peroxide | 60 |
| Isopropanol | 1890 |
| Acetone | 125 |
| Water | 40 | and there is charged thereto

| Butadiene-1,3 | 4410 |
|---|---|
| Methacrylic acid | 90 | and copolymerization is conducted under agitation for 1 hour at 130° C. There is then added 1500 grams styrene, and the polymerization is continued with agitation for 1.5 hours at 130° C.

On vacuum stripping there is obtained about 3960 grams of water-white liquid polymer (66% yield) having a Brookfield viscosity at 30° C. of about 1375 poises and comprising, in addition to the polymerized monomer material therein, substituent functional groups derived from the 2-propylidenehydroxyhydroperoxide some of which groups are hydroxy groups and some of which are the hydroxyalkylideneoxy groups so derived, namely the hydroxy-2-propylideneoxy groups.

EXAMPLE 2

Repetition of Example 1, but polymerizing the monomers with 230 grams of 2-propylidene-hydroxy-hydroperoxide in 2000 grams of isopropanol also yields a brilliant water-white viscous liquid polymer with a yield of 60%, based on monomers charged.

EXAMPLE 3

To a 5-gallon aluminum lined reactor is charged 1000 grams of a solution (designated A–VI–138 by applicant) of the following approximate composition:

2-propylidinehydroxy-hydroperoxide—20 grams
Hydrogen peroxide—67 grams
Isopropanol—705 grams
Acetone—185 grams
Water—23 grams
85% phosphoric acid—0.011 ml.
6% cobalt naphthenate—0.016 gram and to this solution is added 6000 grams of butadiene and polymerized with agitation at 125° C. for two hours. The liquid polybutadiene is recovered, as by stripping out solvent residues by a single pass through a Kontro wiped film stripped at 140° C. and 30″ of vacuum, and yields about 3400 grams (57% yield based on monomers) of water-white liquid polymer of approximately 354 poises (Brookfield 30° C.).

EXAMPLE 4

To the 5-gallon aluminum lined reactor is charged 1000 grams of a solution of the following approximate composition:

|  | Grams |
|---|---|
| 2-butylidene-hydroxy-hydroperoxide | 250 |
| Methanol | 2000 | to this solution is charged 6000 grams of isoprene, and polymerized with agitation at 130° C. for three hours. Stripping yields a polymer in about 50% yield, based on monomers, with a viscosity of about 500 poises (Brookfield 30° C.).

EXAMPLE 5

Repetition of Example 1, without methacrylic acid, and with the styrene replaced by mixed vinyl toluenes (Dow Chemical Co.) charged simultaneously with the butadiene, and with the polymerization continued for the full two and one-half hours with no interruption, produces water-white polymer in about 60% yield based on monomers and of Brookfield viscosity (30° C.) about 2000 poises.

EXAMPLE 6

In a 5-gallon reactor employed in Example 1 is placed a solution having the following composition:

|  | Grams |
|---|---|
| 2-ethylidenehydroxy-hydroperoxide | 190 |
| Hydrogen peroxide | 60 |
| 2-butanol | 322 |
| Methyl-ethyl-ketone | 155 |
| Water | 40 | and thereafter is charged 5900 grams of butadiene and 100 grams of acrylonitrile. After polymerization with agitation at 115° C. for four hours and stripping, a copolymer of about 70% conversion based on monomers is obtained having a Brookfield viscosity (30° C.) of somewhat above 1000 poises.

EXAMPLE 7

To the aluminum lined five-gallon agitated pressure reactor is charged a solution having the following composition:

|  | Grams |
|---|---|
| 2-propylidenehydroxy-hydroperoxide | 300 |
| Hydrogen peroxide | 35 |
| Isopropanol | 3100 |
| Water | 70 | to which is further charged

| Butadiene-1,3 | 4200 |
|---|---|
| Raw linseed oil | 700 |
| Isano oil | 350 |

Polymerization at 118° C. for 2 hours at vacuum stripping yields 3730 grams of pale yellow viscous liquid polymer.

EXAMPLE 8

This example is carried out like Example 3 except that the phosphoric acid is omitted and further 1200 grams of the butadiene is replaced by 1200 grams of dehydrated castor oil having a Gardner-Holdt viscosity G–H. The amount of pale yellow product after vacuum stripping is about 3500 grams and its viscosity at 30° C. is in the range of 500–600 poises.

EXAMPLE 9

Repetition of Example 3, but with the isopropanol replaced by an equal weight of acetone produces a yield of polymer of about 45%, and also of low viscosity.

EXAMPLE 10

Repetition of Example 6, substituting for the monomers a mixture of 4800 grams butadiene and 1200 grams acrylonitrile and polymerizing at 115°–120° C. for about 2 hours to about 75% conversion of the monomers to polymer, produces a solid butadiene/acrylonitrile copolymer.

By replacing components used in the foregoing examples with other components grouped therewith in the foregoing general description and by varying the conditions of polymerization within the limits above set forth, other exemplification of the present invention are obtained.

Thus, while there have been described herein what are at present considered preferred embodiments of the invention it will be obvious to those skilled in the art that minor modifications and changes may be made without departing from the essence of the invention. It is therefore to be understood that the exemplary embodiments are illustrative and not restrictive of the invention, that the scope of products claimed is defined in the appended claims; and that all modifications that come within the meaning and range of equivalency of the claims are intended to be included therein.

What is claimed is:
1. A polymer produced by a process which comprises:
    (a) forming a homogenous reaction mixture comprising, by weight,
        (1) 100 parts polymerizable ethylenically unsaturated monomer material, and
        (2) 0.5 to 10 parts of alkylidenehydroxyhydroperoxide, and
    (b) heating said mixture
        (1) at a temperature in the range of from above 100 to 200° C.
        (2) for from 10 minutes to 10 hours,
        (3) to a conversion of monomer material to polymer of at least 35%, and
    (c) recovering the formed polymer,
    (d) said alkylidenehydroxyhydroperoxide containing from 2 to 6 carbon atoms,
said polymer comprising hydroxy-containing substituent groups derived from said alkylidenehydroxyhydroperoxide.

2. A polymer as claimed in claim 1, produced by employing 2-propylidenehydroxyhydroperoxide as alkylidenehydroxyhydroperoxide, and comprising hydroxyl-containing substituent groups derived from said 2-propylidenehydroxyhydroperoxide.

3. A polymer as claimed in claim 1, produced by employing conjugated diene monomer as at least a part of the ethylenically unsaturated monomer material, said polymer being an unsaturated polymer comprising hydroxyl-containing substituent groups derived from said alkylidenehydroxyhydroperoxide.

4. A polymer as claimed in claim 3, further characterized in that
    said unsaturated polymer is a liquid polymer having a viscosity at 30° C. in the range of 30 to 30,000 poises.

5. A polymer as claimed in claim 3, further characterized in that
    said unsaturated polymer comprises at least 50% by weight of polymerized conjugated diene monomer.

6. A polymer as claimed in claim 3, further characterized in that
    said unsaturated polymer comprises at least 50% by weight of polymerized butadiene-1,3.

References Cited

UNITED STATES PATENTS

| 2,586,594 | 2/1952 | Arundale et al. | 260—680 |
| 3,135,805 | 6/1964 | Gilmont | 260—94.2 XR |
| 3,222,327 | 12/1965 | Guillet et al. | 94.2 XR |
| 3,222,294 | 12/1965 | Meyer | 260—94.2 XR |
| 3,333,018 | 7/1967 | Burke et al. | 260—683.15 XR |
| 3,333,015 | 7/1967 | Burke et al. | 260—683.15 XR |

JOSEPH L. SCHOFER, Primary Examiner

W. F. HAMROCK, Assistant Examiner

U.S. Cl. X.R.

260—93.1, 683.15, 95, 63, 93.5, 89.5, 88.7, 88.3, 89.7, 91.3, 93.3, 91.5, 92.1, 83.7, 92.8, 91.1.